(12) United States Patent
Wilson

(10) Patent No.: US 11,599,607 B2
(45) Date of Patent: Mar. 7, 2023

(54) AUTHENTICATION METHOD AND SYSTEM FOR A TELECOMMUNICATIONS SYSTEM

(71) Applicant: Arnold Albert Wilson, Bangor County Down (GB)

(72) Inventor: Arnold Albert Wilson, Bangor County Down (GB)

( * ) Notice: Subject to any disclaimer, the term of this patent is extended or adjusted under 35 U.S.C. 154(b) by 0 days.

(21) Appl. No.: 16/338,621

(22) PCT Filed: Sep. 28, 2017

(86) PCT No.: PCT/EP2017/074616
§ 371 (c)(1),
(2) Date: Apr. 1, 2019

(87) PCT Pub. No.: WO2018/060327
PCT Pub. Date: Apr. 5, 2018

(65) Prior Publication Data
US 2020/0045542 A1 Feb. 6, 2020

(30) Foreign Application Priority Data
Sep. 30, 2016 (GB) ...................... 1616664

(51) Int. Cl.
*G06F 21/31* (2013.01)
*H04L 9/40* (2022.01)
(Continued)

(52) U.S. Cl.
CPC .......... *G06F 21/313* (2013.01); *H04L 63/083* (2013.01); *H04L 63/0853* (2013.01);
(Continued)

(58) Field of Classification Search
CPC ............. G06F 21/313; H04W 12/0609; H04L 63/083; H04L 63/0853; H04L 63/0869
(Continued)

(56) References Cited

U.S. PATENT DOCUMENTS 6,731,731 B1 * 5/2004 Ueshima ................. G06F 21/31
726/5
7,065,341 B2 * 6/2006 Kamiyama ........... H04L 63/083
713/168

(Continued)

OTHER PUBLICATIONS

International Search Report completed Nov. 28, 2017, for International application No. PCT/EP2017/074616.

*Primary Examiner* — Dant B Shaifer Harriman
(74) *Attorney, Agent, or Firm* — Warner Norcross + Judd LLP

(57) ABSTRACT

An authentication method for a telecommunications system comprising a computer network and a telephone network that includes receiving, at an Authentication System across the computer network, data indicative of an authentication request. The request is typically made by a provider in connection with a user (e.g. by a provider to obtain authentication from a user as the result of an authentication trigger detected by a provider system). A telephone call is establishing by the telephone network between the Authentication System and a telephone device with a telephone number associated with the user. A PIN is received from the user at the Authentication System during the telephone call. It is then determined if the received PIN is valid. The authentication request is authenticated if the PIN is determined to be valid.

22 Claims, 3 Drawing Sheets

(51) Int. Cl.
*H04W 12/069* (2021.01)
*G06F 21/43* (2013.01)

(52) U.S. Cl.
CPC ....... *H04L 63/0869* (2013.01); *H04W 12/069* (2021.01); *G06F 21/43* (2013.01)

(58) Field of Classification Search
USPC .......................................................... 726/5
See application file for complete search history.

(56) References Cited

U.S. PATENT DOCUMENTS

| | | | |
|---|---|---|---|
| 8,239,921 B2 * | 8/2012 | Benschop | G06Q 10/10 |
| | | | 713/182 |
| 8,527,773 B1 | 9/2013 | Metzger | |
| 2008/0015995 A1 * | 1/2008 | Chen | G06F 21/32 |
| | | | 705/50 |
| 2009/0222669 A1 * | 9/2009 | Huang | G06Q 20/3224 |
| | | | 370/310 |
| 2009/0304162 A1 * | 12/2009 | Fujii | H04L 63/08 |
| | | | 379/93.02 |
| 2009/0323906 A1 * | 12/2009 | Jaiswal | H04M 3/382 |
| | | | 726/5 |
| 2014/0137234 A1 * | 5/2014 | Chin | H04W 12/065 |
| | | | 726/19 |
| 2015/0024712 A1 | 1/2015 | Kang | |
| 2016/0156627 A1 | 6/2016 | Wallaja | |

\* cited by examiner

AUTHENTICATION METHOD AND SYSTEM FOR A TELECOMMUNICATIONS SYSTEM

FIELD OF THE INVENTION

This invention relates to authentication methods for communications and information systems. The invention relates particularly to authentication of system users and system providers across telecommunications and computer networks and systems.

BACKGROUND TO THE INVENTION

The proliferation and growth of the internet and the multiplicity of services being provided thereon has created a number of security issues that are detrimental to the growth and development of online services. There is a need to authenticate the identity of both the providers and users of such services, either when users attempt to access such services or when the providers of services need to obtain authentication from a user as the result of actions that have or may have occurred that impact the user. As fraudsters employ more advanced and sophisticated techniques to defraud both the providers of services and their users, the need for improved security has arisen and with it, an increase in the cost of its provision and an increase in the complexity of its use for ordinary users. A plethora of security measures and devices have arisen to tackle these issues.

Fraudsters regularly misrepresent themselves not only as bone fide users to online services but increasingly as bone fide online service and system providers. It is desirable therefore for the authenticity of any service a user may wish to access or when such a service communicates with a user, for the authenticity of the service in question to be confirmed to the user as well as for the identity of the user to be authenticated to said online service or system when the user wishes to access said service or when it may prove advantageous for the service providers system itself to obtain authentication directly from a user in order to obtain confirmation or validation of any transaction involving the user either directly or indirectly on a systematic or ad hoc basis.

Authentication occurs with reference to one or more factors. Authenticating factors can be generally classified into one of three authentication factor categories. These 3 categories are:

Category 1: something the user—i.e. a person wishing to access a service or system who is to be identified, also referred to herein as the authenticatee—known by the authenticator—i.e. the entity providing the service or system—to know (e.g. a PIN (personal identification number) or other password);

Category 2: something the user is known by the authenticator to have (e.g. a hardware device that can be identified, such items collectively referred hereinafter to as "tokens");

Category 3: something the user is known by the authenticator to be (e.g. a biometric characteristic, such as the users fingerprint, retinal image, voice pattern or their DNA).

Authentication is regarded as either weak or strong: authentication of one or even multiple instances of any one factor Category still only constitutes weak authentication whereas strong authentication requires authentication of two or more authenticating factor Categories, this is also referred to as multi-factor authentication. It is generally accepted that strong authentication of a user's identity is essential for secure online or remote interactions between any system and any user.

At present, the primary authentication means employed by online service providers to authenticate the identity of users are the use of passwords, including access codes, security questions answered in whole or in part or the like (i.e. Category 1 Authenticating Factors). Passwords, access codes or security questions, no matter how long or complex or how many there are, provides weak authentication. Technically any remote alpha-numeric entry by a user on any computing device is simple for fraudsters to record, capture, copy and intercept. Complex passwords are difficult to guess, but technically they are in reality no more difficult for skilled fraudsters to obtain than simple or obvious ones but are for the users, difficult to remember. Passwords, if forgotten by the user, typically require the user go through tortuous password recovery processes. As a result, users record their passwords somewhere, which seriously compromises their security.

Most multi-factor Authentication Systems employ Category 2 Factors (e.g. USB connectable tokens) in conjunction with Category 1 Factors (e.g. passwords) to provide strong authentication. The deployment, provision and support of tokens can be costly as they can get lost, stolen and broken and when this occurs, their loss must be reported expeditiously and a replacement provided at added cost and inconvenience to both the provider and user. Loss or theft of such tokens that are used infrequently may go un-reported for considerable periods, compromising the security of any system they provide access to.

Under the known art, Category 2 tokens only provide access to one site so users may have to employ a multiplicity of such tokens that often operate differently, rendering their intermittent use by a user an arduous or even tortuous process.

A closer examination of the way proof of possession of authenticating factors are obtained, exposes a number of flaws and shortcoming in their use. In most instances of multiple factor authentication, each factor is confirmed and applied independently, they are not enmeshed in any way. For example in the case of Chip and PIN the mere possession of the payment card means that only the correct PIN is required to affect payment—a PIN being a Category 1 authenticating factor. Although possession of the payment card technically constitutes a Category 2 authenticating factor, there is no way of determining if the person presenting the card for payment is the bone fide user or indeed whether the card is in fact a clone or copy of the original card.

When authentication occurs online, it occurs entirely via the internet; this is a single communications channel and can therefore be hacked or intercepted anywhere from source to the endpoint. When a user attempts to login to a secured location which utilizes supposed multi-factor authentication, all the authenticating data obtained from the user is passed via the internet to the authenticator through this channel. For example, the user may be sent an SMS message with a numeric code they have to enter. While this code is delivered to the user's phone via the PSTN, it is entered online to be passed through the internet. This means that not only can the SMS be intercepted off-line—SMS messages are susceptible to such interception—authentication is made by entry of the code sent by SMS online, typically at the provider's site. Hence both factors are presented via the same channel—the internet.

Any web site the user is attempting to access may be fake and fraudsters thereby can obtain from the actual user, any passwords, or access codes, sent to the user from the provider by any means, which the fraudster can then enter to the bone fide site to access the users account etc. This is an example of a Man in the Middle (MITM) Attack.

Another example of a MITM Attack is where a fraudster may provide a fake ATM into which the bone fide user presents their ATM card to obtain cash. The fraudster now has physical possession of the user's card. The user is then asked to enter their PIN and in so doing, has now also unwittingly provided the fraudster with the card's PIN. The fraudster now has both possession of the card and it's PIN and the user is quite ignorant of this fact. Fraudsters may contact users directly by SMS, email or telephone and misrepresent themselves as bone fide user service providers and obtain confidential user information thereby: this highlights the need for users to authenticate the identity of service providers to users when they are contacted by them.

All Category 2 Factors—i.e. something the Authenticator knows the Authenticatee has—are susceptible to cloning since mere possession of the token is all that is required for it to act as an authenticating factor. For example, if a user's phone is stolen and the provider system sends a text message with an access code to it, the provider has no way of proving the person in possession of the phone is bone fide.

If a person's identity is authenticated with reference to a fingerprint or PIN by entry onto a device which is also itself acting as a token, unless at that precise instance the token is confirmed as being in the possession of the bone fide user, the token has merely acted as a fingerprint or PIN input device, not as an authenticating Category 2 factor in its own right. In effect, such tokens provide false multi-factor authentication.

For any token to act effectively as a bone fide Category 2 authentication means, it is generally acknowledged that authentication that the token itself is in the actual possession of the bone fide user at the precise moment the token is employed, must be obtained and proof that the token is unique also obtained at that point. Achieving this has proven to be highly problematic.

The use of Category 3 biometric factors is now commonly considered questionable and even highly inadvisable for any form of remote access. It is advisable that the presentation of any biometric factor by a user to be observed by an actual person e.g. retinal scan, finger print, voice pattern or facial recognition. This is because biometric information can easily be copied, replicated or even stolen; hence the mere use of it can put the user in physical jeopardy from a determined fraudster or thief. Where such biometric information is therefore presented by a user remotely, such monitoring is problematic. Furthermore, regardless of the complexity of said biometric data, it has to be encoded into a digital form for transmission to the authenticator and all transmitted digital information can be easily intercepted and copied. A further problem with biometric information pertaining to any user is that it cannot possibly be changed, unlike a password or token, so once it has been copied or compromised, it is effectively invalidated as a secure authentication means. Biometric Authentication Systems are also costly. The combination of their high cost, the potential physical risk of harm they engender, their potential to be easily copied or compromised and the fact that once compromised, the particular biometric concerned is rendered invalid have called Category 3 biometric authentication factors as a viable remote authentication means into serious question.

The cellular phone is potentially a highly robust Category 2 authenticating factor but no viable way to take full advantage of its inherent capabilities has been utilized in the known prior art. Cellular phones have a number of built in security measures that make them resistant to copying or cloning since, for example, the Subscriber Identity Module (SIM) Card would have to be cloned. Furthermore, should a SIM Card be cloned, if two identical SIM Cards are presented onto a subscriber's network, the network operator can be immediately alerted to this and service to that number terminated. This solves the problem of undetectable cloning.

Smartphones, namely cellular phones that have computing capabilities, have been proposed as Category 2 tokens. However, if the phone itself is used as a token, loss or theft of the phone can invalidate any security and any authentication obtained using it in the exact same way as any conventional hardware token such as a credit card. Smartphones are becoming highly sophisticated and valuable and are frequently the target of theft. Making such phones into access tokens would further increase their intrinsic value to thieves so this is not desirable.

Use of cellular phones for authentication purposes under the known art has been achieved principally by utilizing the built in ability of cellular phones to send and receive Short Message System (SMS or "text") messages. However, the SMS system is inherently insecure and wholly inappropriate for strong authentication purposes. It is a simple task to both intercept SMS messages and fraudulently present an SMS message onto subscriber networks.

Smartphones are phones with computing capabilities. This capability has been exploited to enable "software" tokens to be stored on the phone ostensibly enabling them to act as Category 2 factors. The problem is that the token is stored on the phone so mere possession of the phone is proof of ownership of the token. Furthermore, even if the token is encrypted, there is the risk of it being hacked. Making a phone into the token in this manner therefore makes the phone an even more intrinsically valuable object of theft to any thieves or fraudsters, particularly where the phone can act as a payments authentication token.

Providers of services to users may find it advantageous to obtain authentication from users not only when users attempt to access their services online, but also as the result of a multiplicity of possible circumstances or conditions that may concern a user of a service, including and not limited to when users interact directly or indirectly with the provider service or as the result of the user transacting with a third party service that also impacts the provider service. For example a, bank—who in this instance is the service provider—may wish to confirm from the user that a third party request for payment from the users bank account, is a bone fide payment request known to the user.

A means of obtaining strong authentication from users that would not require the production, distribution and support of any form of token or special reader by enterprises for whom such authentication is both desirable and commercially advantageous. Likewise it would be desirable for such a means to be able to be used by service providers to obtain authentication from users on a systematic or an ad hoc basis as determined by the service provider and for the authenticity of the provider to be simultaneously affirmed to the user.

SUMMARY OF THE INVENTION

A first aspect of the invention provides an authentication method for a telecommunications system comprising a computer network and a telephone network, the method comprising:

receiving, at an Authentication System across said computer network, data indicative of an authentication request, the request typically being made by a provider in connection with a user (e.g. by a provider to obtain authentication from a user as the result of an authentication trigger detected by a provider system), establishing by said telephone network a telephone call between said Authentication System and a telephone device with a telephone number associated with the user;

receiving, at said Authentication System during said telephone call, a user password;

determining at said Authentication System if said received user password is valid;

authenticating said authentication request if said user password is determined to be valid.

The user password is provided by the user by means of the telephone device, conveniently using a keypad of the telephone device.

In preferred embodiments the user password comprises a PIN (personal identification number). More generally the user password may comprise one or more words, or a string of numeric or alphanumeric characters.

Preferred embodiments of the method include delivery by said Authentication System to said telephone device during said telephone call identification data, typically identification data relating to said authentication request, said identification data for example comprising any one or more of a provider name, provider password, system password, application password, a login security code and/or a qualifying statement.

In preferred embodiments said telephone call is established using a telephone number associated with said user, and wherein determining if said user password is valid involves determining if said user password is linked to said telephone number.

In preferred embodiments said authentication requests may be created by a provider computer system in response to an authentication trigger. The authentication trigger may comprise any system event connected with said user that is deemed (typically by said provider) to warrant an authentication from the user, most typically system events on the provider's computer system. For example the authentication trigger may arise as the result of any input to, interaction with or activity on the provider's computer system by any one or more of a user, or a provider employee or third party.

For example, said authentication request may be created by a user access request involving establishing, at a user computing device, a connection across said computer network with a provider computer system or other computing device. Typically said access request is created by establishing, at a user computing device, a connection with a provider computer system to access at least one software application supported by said provider computer system.

In preferred embodiments said authentication trigger causes the provider computer system to compile authentication request data, said data comprising data indicative of any one or more or the identity of said user, the provider's identity, a provider system identity, a computing device identity, at least one software application identity, the contents of or identity of a qualifying statement, the location of said user telephone device and/or an identity of said user telephone device. Said authentication request data may comprise data indicative of the identity of said user and/or at least one telephone number associated with said user In preferred embodiments a qualifying statement comprises a spoken message included in the telephone call for informing the user what the purpose of the authentication call is or what the user is being called to verify. Typically, a qualifying statement can be in the form of a text string to be converted into speech, or an audio file, or other data capable of being audio-rendered. The contents of the statement may be generated by the provider computer system on an ad hoc basis as the result of the authentication triggering event and delivered to the authentication system as part of the authentication request data or it may be pre-determined and stored at the Authentication System and identified for use by the authentication request data, or a combination of the two.

Typically the method includes maintaining at said Authentication System, an electronic user record for each user of the system, the user record containing data indicative of at least one user password. The method optionally includes maintaining at said Authentication System an electronic provider record for each system provider, the provider record comprising data indicative of any one or more of the provider name or other identifier, and any qualifying statement data, e.g. text or audio files.

In preferred embodiments said user record contains data linking the, or each, user password to a respective telephone number, and optionally to any one or more of at least one software application, a provider identity, a provider system identity, at least one user telephone device, and/or a computing device identity.

Preferably determining if said received user password is valid involves matching said received user password to at least some of the data in the user record for the respective user. Said determining if said received user password is valid typically involves matching said received user password to the user password contained in the respective user record for the respective telephone number.

The preferred method further includes matching, at said Authentication System, the received authentication request data to at least some of the data in the respective user record for the user, and establishing said telephone call upon determining that there is at least one match between the respective data. Matching the received authentication request data to at least some of the data in the respective user record for the user may involve matching the authentication request data with any one or more of the provider identity, provider system identity, computing device identity, qualifying statement script, at least one software application identity and/or identity of said user telephone device with the corresponding data of the respective user record.

Typically, establishing said telephone call involves obtaining said telephone number from the respective user record. Said user record may contain more than one telephone number and establishing said telephone call may involve selecting one of said telephone numbers as identified in the authentication request data.

In preferred embodiments, when authentication request data is received, the method includes transmitting, to said telephone device from said Authentication System during said telephone call, at least one password, for example a system password(s) and/or application password(s), associated with said telephone number and rendering said password(s) to said user by said telephone device. The particular password(s) rendered may be indicated by the received authentication request data and/or qualifying statement.

Typically said telephone call is established using a telephone number associated with said user, said method further including storing at said Authentication System said passwords in association with said telephone number and/or said user, and optionally in association with the provider identity, qualifying statements, provider system identity, computing device identity, at least one software application identity, and/or identity of said user telephone device.

Conveniently said password(s), including as applicable said system password(s) and provider application password (s), are stored in the respective user record and are associated with the provider. The method typically includes receiving at said Authentication System during a registration process said system and application password(s), and/or other relevant password(s) from said user. Typically the first time a user completes said registration process, the password recorded by the Authentication System is both the system password and the application password, where the provider has requested same as part of the said user registration process. When a user is called by the Authentication System the application password relating to the application to which the authentication call relates is played to the user. However, where the authentication call relates to an authentication request that is not specifically related to a particular provider application or where no specific application password has been created, the system password is played to the user during said call.

In preferred embodiments said system or application passwords and any qualifying statement scripts are contained in audio files and said rendering of said passwords and qualifying statement scripts involve playing back said audio files by said Authentication System. Additionally, said passwords and qualifying statements may be in text files that are rendered by the Authentication System by playing back said text files using text to speech technology.

Optionally the method includes determining at said Authentication System a location of said user; authenticating said authentication request if said location is determined to be valid. The method may include maintaining at said Authentication System, an electronic user record for each user of the system, the user record containing data indicative of one or more valid location, said location data optionally being linked to any one or more of the user, at least one telephone number associated with the user, a provider identity, a provider system identity, a computing device identity, at least one software application identity and/or an identity of said user telephone device.

Conveniently said user telephone device and said user computing device are provided as a single device, for example a smartphone.

In preferred embodiments said computer network is the Internet.

In preferred embodiments said telephone network is the Public Switched Telephone Network (PSTN).

A second aspect of the invention provides an authentication method for a telecommunications system comprising a computer network and a telephone network, the method comprising:

receiving, at an Authentication System across said computer network, data indicative of an authentication request, the request typically being made by a provider in connection with a user (e.g. by a provider to obtain authentication from a user as the result of an authentication trigger detected by a provider system), establishing by said telephone network a telephone call between said Authentication System and a telephone device associated with said user;

transmitting, to said telephone device from said Authentication System during said telephone call, a system password associated with said telephone number and/or said user; and rendering said system password to said user by said telephone device; and/or transmitting to said telephone device from said Authentication System during said call, an application password associated with a provider application and said telephone number and/or said user and rendering said application password to said user by said telephone device.

A third aspect of the invention provides an Authentication System for a telecommunications system comprising a computer network and a telephone network, the Authentication System being configured to: receive across said computer network data indicative of an authentication request to authenticate a user; establish using said telephone network a telephone call between said Authentication System and a telephone device associated with said user; receive during said telephone call, a user password; determine at said Authentication System if said received user password is valid; and authenticate said request if said user password is determined to be valid.

A fourth aspect of the invention provides an Authentication System for a telecommunications system comprising a computer network and a telephone network, the Authentication System being configured to receive, across said computer network, data indicative of an authentication request, establish by said telephone network a telephone call between said Authentication System and a telephone device associated with said user; transmit to said telephone device during said telephone call, a system password associated with said telephone number and/or said user; render said system password to said user by said telephone device; and/or transmit to said telephone device during said call, an application password associated with a provider application and said telephone number and/or said user and render said application password to said user by said telephone device.

A fifth aspect of the invention provides an authenticating telecommunications system comprising a computer network, a telephone network and the Authentication System of the third aspect or fourth aspect of the invention.

Preferred embodiments provide improved security at a lower cost to system and service providers, and advantageously provide a universally available, faster and simpler to use secure access means for ordinary users. Preferred embodiments enable provider systems to obtain user authentication on any pertinent matter at any time as the result of any system event the provider system or service may determine. Advantageously, the need for users to remember multiple passwords and have many security tokens hardware is eliminated, replacing the multiple passwords required to access the multiplicity of systems and services a user may wish to access with a single PIN and a single token, this token conveniently being the user's own phone. Preferred embodiments provide single, fast, universally available, simple to use and highly secure identity authentication means that enables users access to a plurality of services and systems and at the same time offers the providers of these services and systems a simple, a flexible, low cost means of both authenticating themselves to users and of obtaining authentication from said users.

In preferred embodiments authentication is provided to the user of the service or system contacting them prior to their interacting with it.

In preferred embodiments all users and providers can access records and logs of any or all authentication requests and the outcomes of same, to which they are party.

Since a user's phone is used by them frequently, its loss or theft is likely to be noticed and reported expeditiously, the user will act quickly to replace it and its loss or theft incurs no cost whatsoever to the system or service providers that use preferred embodiments of the present invention to authenticate the user. Furthermore, preferred embodiments support the use of multiple telephone numbers to be used to authenticate the user to the provider at no loss of security, so the loss, malfunction or disconnection of a user's primary telephone number does not preclude them from being able to access any service or system that uses preferred embodiments of the invention to authenticate the user as they can utilize another phone number that has been registered in accordance with this invention to act as a secondary back-up. Indeed, any number of such back-up numbers may be employed at the determination of the provider.

Advantageously, preferred embodiments provide a user authentication means that works identically for any system, e.g. not requiring a respective Category 2 token for each system or service.

In arriving at the present invention it is recognized that if two authenticating Factors are enmeshed security is significantly enhanced. For example if it were first determined that the user was in possession of the card before PIN entry, Chip and PIN would be extremely difficult to compromise.

In preferred embodiments, the internet and PSTN are simultaneously involved in the authentication process, and the level of complexity this creates for any hacker increases exponentially. In preferred embodiments authentication occurs via the internet as one channel and the PSTN as another channel, providing a higher degree of security than any single channel system.

By enmeshing authentication on at least two channels, preferred embodiments of the invention are highly resistant to attacks, in particular MITM attacks.

In preferred embodiments, the person in possession of the phone authenticates themselves as such by entry of a password, preferably a PIN, known only to the bone fide user of the phone otherwise the phone is not accepted as an authenticating factor. By enmeshing the PIN entry on the user's phone via PSTN simultaneously with an authentication request from a provider's system online via the internet, both possession of the phone as an authenticating factor and PIN entry by the user on the phone enmesh in such a manner as to make them mutually validating, since the phone as an authenticating factor is only recognized as such by correct entry on said phone of the correct PIN, this process itself advantageously being initiated online and confirmation of this passed to the provider system via the internet.

The owners of cellular phones are highly motivated to maintain the serviceability of their personal phone and so they are constantly vigilant as to its whereabouts: this is in stark contrast to using special tokens to enable users to access online locations, when these are frequently misplaced due to infrequent use or their theft remain undetected. There is therefore no need for the authenticating party to provide or maintain tokens specifically for the purpose of acquiring strong authentication from the user, since the user's own phone is suitable for that purpose. In effect, preferred embodiments of the invention enable a phone number to provide a free and universal authentication token. Advantageously it is not the phone that is the token, but the phone number.

Preferred embodiments of the present invention do not require any data to be stored on the phone; hence its theft does not pose any threat to the integrity of the system's utility and renders the phone no more intrinsically valuable.

Given the speed, effectiveness and simplicity of preferred embodiments, the invention can readily be combined with existing Authentication Systems and methods to further enhance its utility, particularly when a provider wishes to impose additional constraints on the user, such as the locations from which they may access the provider's applications or the particular internet connected device they may use to request such access.

Optionally, authentication of a user may be limited to known devices using security certificates, cookies or the like, stored on the device, conveniently by using existing prior art techniques.

It may be advantageous for authentication to require the user to be at a certain physical location. The IP address of the internet connected device from which the access request to an application is made can provide an approximation as to the user's location, conveniently using existing prior art techniques. The optional use of a landline phone number provides the added utility of ensuring that authentication of the user constrains the user to do so from the location where the landline presents itself to the PSTN, typically at the user's place of work or their home. The location of any mobile device can be determined with considerable accuracy using GPS (Global positioning System) or known triangulation technologies, so the permitted location of the user when authentication occurs on that phone using this invention can be constrained by the service application provider. For example, where authentication is employed to enable a user to gain physical access to a fixed location, possibly protected by a remotely activated electronic lock, the access provider may require that location detection means is used to confirm that the phone user is within a predetermined distance of that fixed location.

In preferred embodiments the user's phone number (and not the user's phone) is used as an authenticating factor, by associating the phone's number and not the actual phone device with a PIN known only to the phone's user, with the PIN not being stored on the phone. A phone number is not a tangible entity, unlike a hardware token. A phone number only assumes a presence when the subscriber account associated with it is active and the phone number is connected to the PSTN through a physical fixed line or by a mobile telephone device. Use of the phone number in this way is not under the control of the user as an authenticating token, but under the control of the service provider. This is because, in preferred embodiments, it is the service provider's systems that initiate both the registration of the phone as an authentication means and who then can invoke its use as an authentication means as provided for by this invention, as they may determine. Every phone number in the world has the inherent advantage of being unique. This innovative use of the phone number and not the phone device as a token resolves a number of highly problematic issues associated with the provision of tokens as authenticating factors: a phone number cannot be lost or stolen in the way the phone device can, as the phone number is separate to the phone device. Loss or theft of the user's phone does not compromise the inherent security of this invention since the PIN is both stored and validated remotely from the user's phone and is not recorded, validated or stored on the phone device. Furthermore, where the phone number is for a mobile device, should the phone be lost or stolen, the particular SIM card can be rendered inactive by the service provider and the user can keep their number and replace the SIM card and the phone. All other forms of token must be replaced completely, so its loss or theft can seriously impair the user's ability to access the system or service to which the token relates.

Preferred embodiments support a user having one or more phone numbers connected to the PSTN for use as described herein. Typically, however, the use of more than one user phone number for the purposes of authentication is entirely at the determination of the system provider. This provides the added utility of enabling the provider to create authentication redundancy for system or service users, in case the user's primary phone is lost or stolen, ensuring the user has an alternative back-up phone that provides identical authentication means with no loss of security.

Advantageously, no modifications whatsoever are required to any user phone to enable it to function according to preferred embodiments of the invention nor is any computing device or connection to the internet required by the user from whom authentication is being obtained.

Accordingly, preferred embodiments provide an identical means whereby the same user phone number can be used by many unrelated enterprise systems and service providers as a strong authentication means for their individual systems, with no loss of security, thus eliminating the need for the user to have multiple individual security devices for each system they use that requires strong authentication of their identity, and this is highly advantageous to service providers who can beneficially utilize this invention while incurring no cost for the provision of tokens.

It will be apparent that preferred embodiments of the invention provide simultaneous enmeshed multi-channel multi-factor authentication of authenticator and authenticatee.

In preferred embodiments provider services and systems can initiate authentication with users. It will be apparent that this capability enables provider services and systems to authenticate actions, permissions and transactions determined by the system to be beneficial to the user and/or service provider, directly from users expeditiously and securely.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
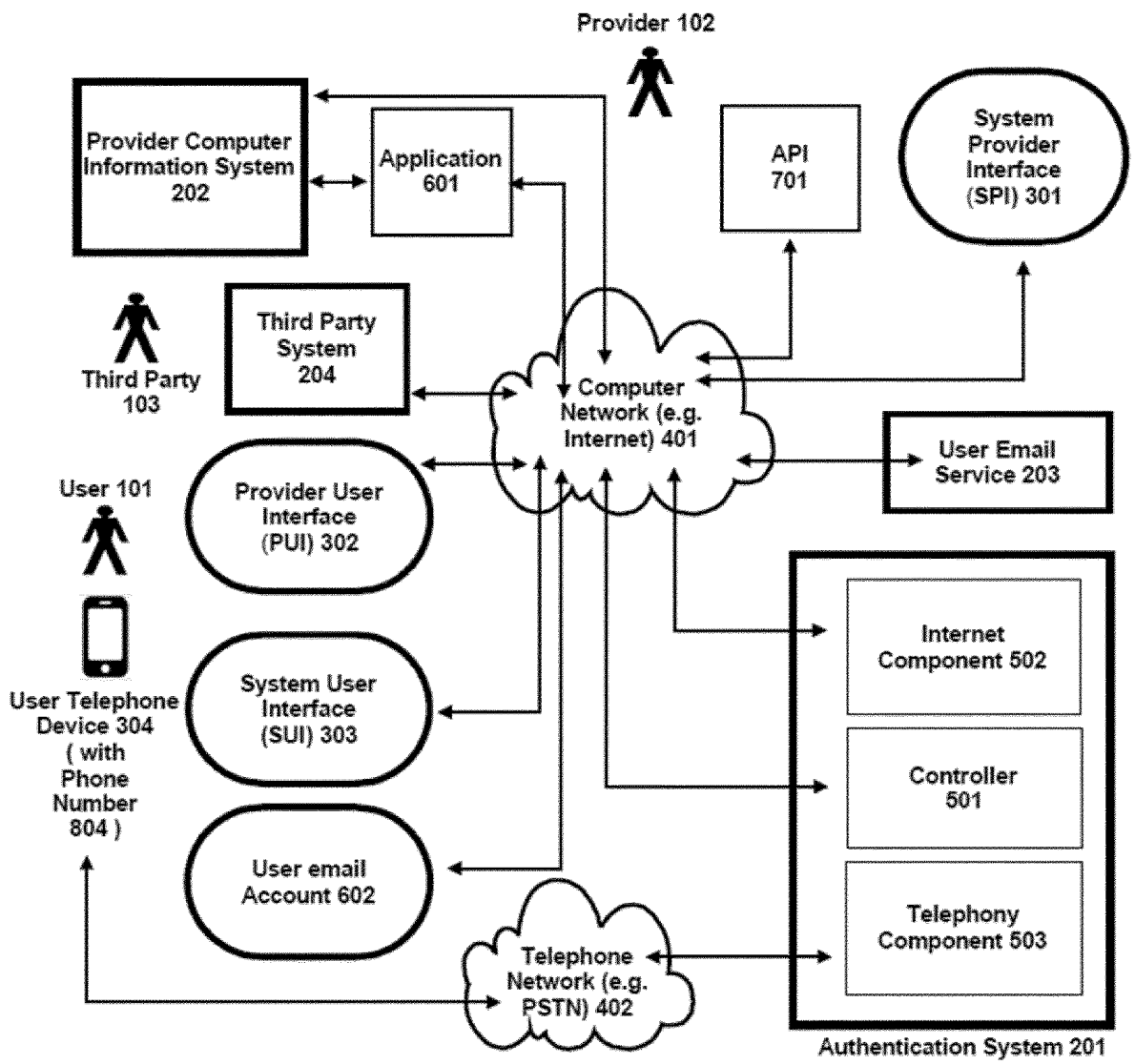
FIG. 1 is a schematic diagram of an Authentication System embodying one aspect of the invention.

Referring now to FIG. 1 of the drawings there is shown, generally indicated as System 10, a preferred authenticating telecommunications system embodying one aspect of the invention. The System 10 includes a global Computer Network 401 and a Telephone Network 402.

In typical embodiments, the global Computer Network 401 comprises the Internet, i.e. a global system of interconnected computer networks that support the Internet Protocol (IP) Suite. In alternative embodiments, the Computer Network 401 may not be a global computer network. In any case the Computer Network 401 may comprise multiple interconnected computer sub-networks, for example comprising one or more Local Area Network (LAN) and/or one or more Wide Area Network (WAN), parts of which may be wired or wireless as convenient.

Typically, the Telephone Network 402 comprises the Public Switched Telephone Network (PSTN). The Telephone Network 402 includes, as applicable, telephone lines (e.g. land lines), fibre optic cables, microwave transmission links, cellular networks, communications satellites, and undersea telephone cables, all interconnected by switching centres, or exchanges (not shown).

Figure 2:
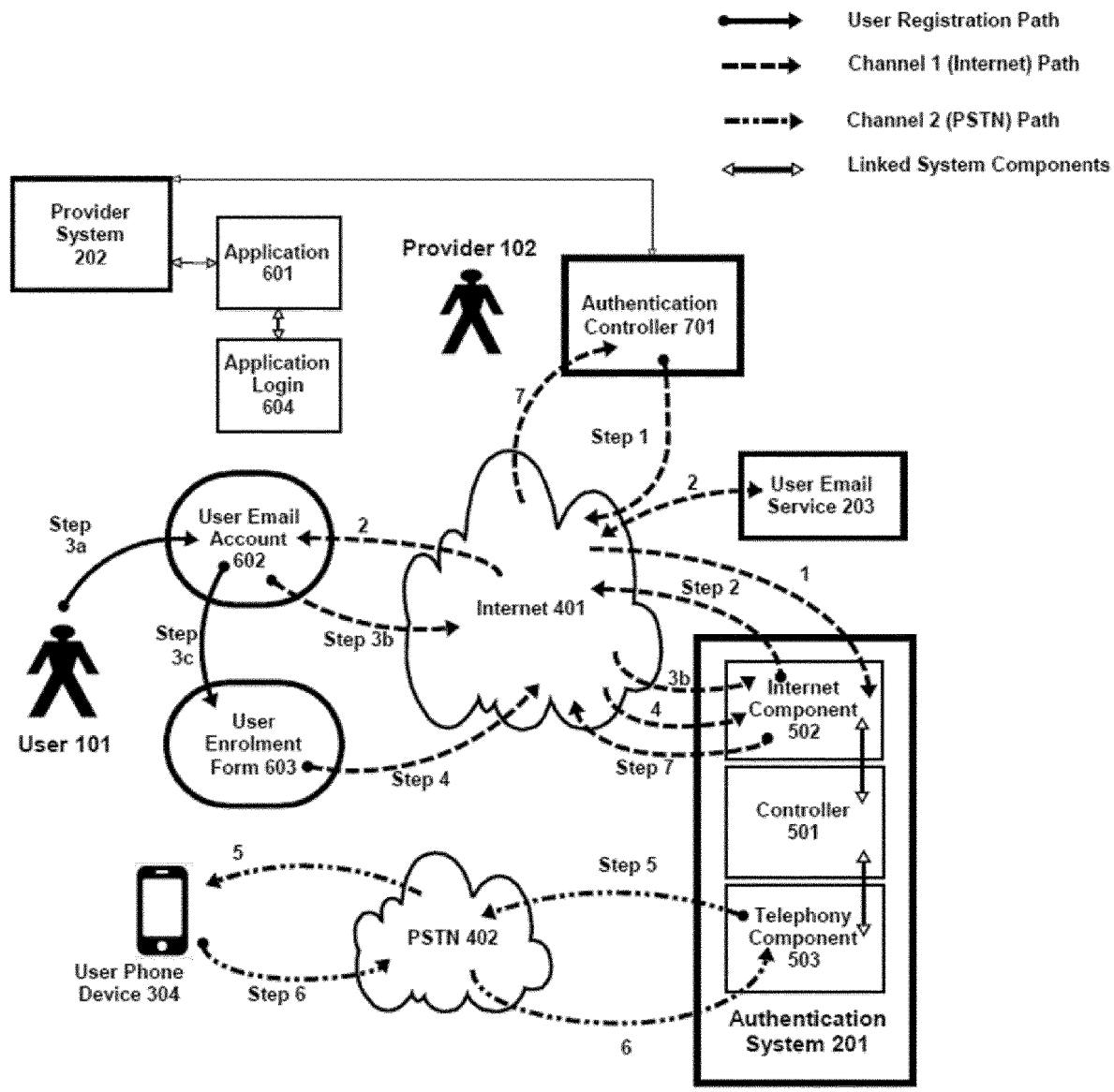
FIG. 2 is a schematic diagram illustrating a preferred registration method implemented by the system of FIG. 1.
Figure 3:
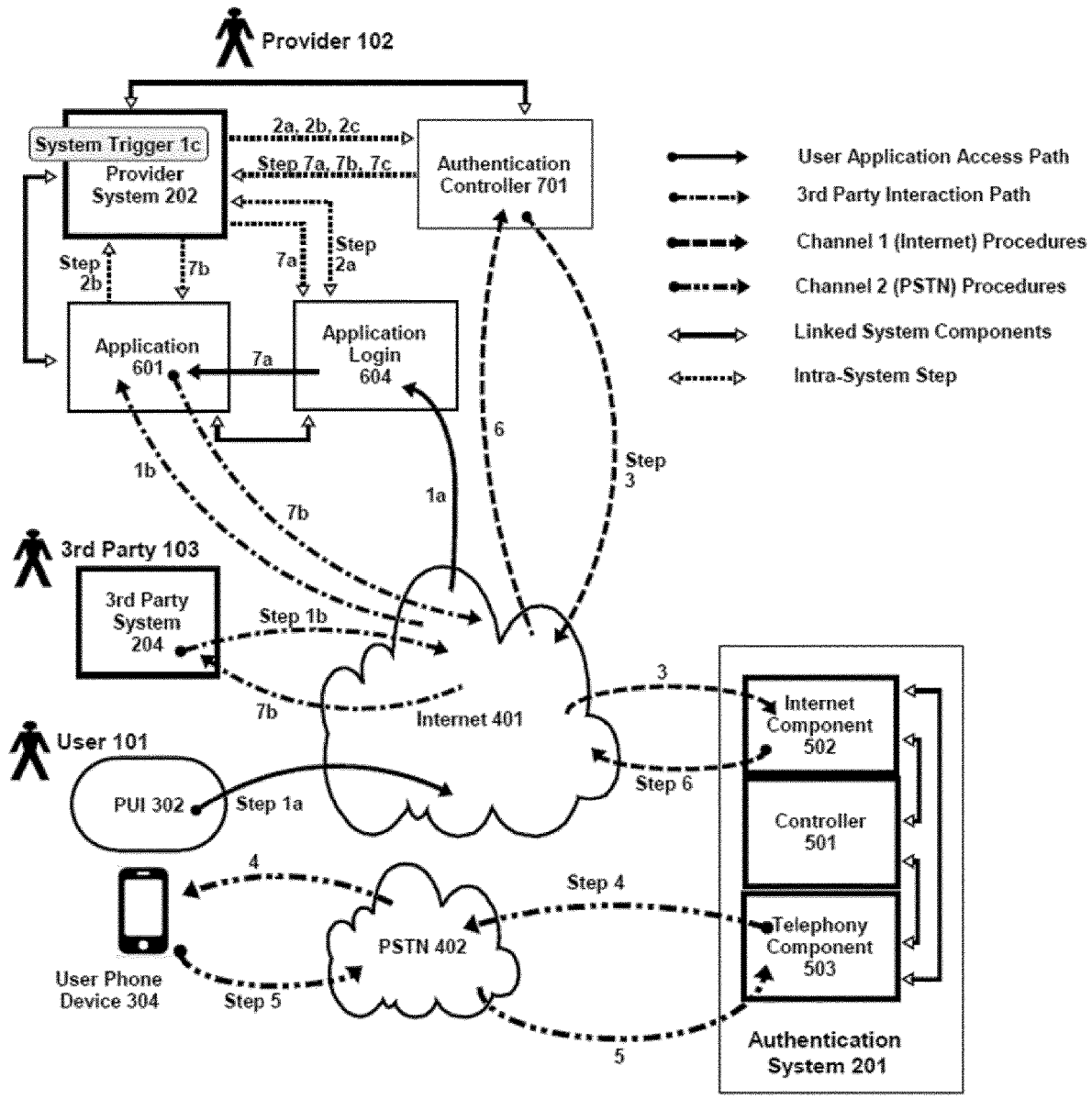
FIG. 3 is a schematic diagram illustrating a preferred authentication method implemented by the system of FIG. 1.

Each User 101 of the System 10 has a User Telephone Device 304 (hereinafter also referred to as the User Device 304) that is able to make and receive telephone calls via the Telephone Network 402. The User Phone Device 304 is typically a mobile (cellular) telephone but may alternatively be a land line telephone. Each User 101 also has a computing device, for example a PC, laptop or tablet, which is capable of communicating with other computers via the Computer Network 401. Conveniently, the User Phone Device 304 can have both the capabilities of a telephone and a computer such that it is able to make and receive telephone calls via the Telephone Network 402 and is also able to communicate with other computers via the Computer Network 401. For example the User Device 304 may be a smartphone, i.e. a mobile (cellular) telephone that supports a mobile computer operating system. More generally, the User Device 304 used by the User 101 to access a service provider system or service represented in FIGS. 1 to 3 as the Provider Computer Information System (Provider System) 202 via any Computer Network 401, may be any computing device, typically but not necessarily a mobile computing device, that may or may not have the aforementioned telephone capabilities. It is to be understood therefore that the User 101 may use a computing device to access the Internet 401 and telephone device to connect to the Telephone Network 402 and that both these capabilities may be performed on a single device (e.g. a smartphone) or alternatively on a separate computing and telephone devices. The User 101 is typically an individual who uses a service or a system, provided by a Provider 102 via the Computer Network 401. The Provider 102 is typically a person or enterprise who provides a service, system or the like, either at a physical location or online, that the User 101 and/or Third Parties 103 may wish to access and use. Third Parties 103 are persons and enterprises that the Provider 102 typically has pre-existing relationships with, such as customers, suppliers, other service providers or other users, such that interactions between the Provider System 202 and the Third Party's Computer System (Third Party System) 204 may occur. In FIGS. 1 to 3 the Provider's System 202 supports a software application 601 configured to provide the required interaction with a software application (not shown) on the User Device 304 (e.g. a browser or dedicated application) or Third Party System 204 in order to provide the relevant service(s) to Users 101 or Third Parties 103 via the Computer Network 401. In practice the Provider System 202 and/or the User Device 304 and/or Third Party Systems 204 may support more than one software application for this purpose. Typically, the Provider System 202, User Device 304 and Third Party System 204 interact using the client-server model, with the Provider System 202 acting as the server and the User Device 304 and/or Third Party System 204 acting as the client. Similarly, the respective software applications may be referred to as server(s) and client(s). Such interaction across a Computer Network 401 is conventional and is not described further herein other than is necessary for an understanding of the invention.

In FIGS. 1 to 3 only one User 101 one Provider 102 and one Third Party 103 are shown although in practice there may be multiple Users 101, each having a respective User Device 304, multiple Providers 102 each having a respective Provider System 202 and multiple Third Parties 103 each having a Third Party System 204.

It is assumed that the User 101 is any person whose identity it is desirable for the Provider 102 to authenticate. In order to facilitate authentication, the System 10 includes an Authentication System 201 comprising 3 components configured to provide an authentication service to Providers 102 and Users 101 using the computer network 401 and telephone network 402. To this end, the Authentication System 201 comprises at least one computing device—the Internet Component 502—that is capable of communicating with the Provider System 202 and the User Device 304 across the Computer Network 401 and a Telephony Component 503 device that is capable of communicating with the User Telephone Device 304 over the Telephone Network 402. The Authentication System 201 further includes a Controller 501 which controls, monitors, implements and co-ordinates all the processes and tasks performed by the Authentication System 201 as described in more detail hereinafter, including the storage and retrieval of data. In the illustrated embodiment, the Internet Component 502 is configured to perform all tasks pertaining to communications to and from the Authentication System 201 over the Computer Network 401, which in this case comprises the Internet 401. In the illustrated embodiment, the Telephony Component 503 is configured to perform all tasks pertaining to communications to and from the Authentication System 201 over the Telephone Network 402, which in this case comprises the PSTN.

It will be understood that all of the hardware and software components of the illustrated embodiment are presented by way of example and that there are a multiplicity of possible alternative ways in which the system could be implemented. However, preferred embodiments are in any event configured to implement the logical order of processes and flow of information described herein.

FIG. 2 illustrates a preferred registration method, referred to in this embodiment as the User Registration Process 904, comprising processes required to enable the User 101 to be validly registered with the Authentication System 201. FIG. 3 illustrates a preferred authentication method, referred to in this embodiment as the Authentication Process 905 comprising the preferred process of providing authentication.

For the purposes of authentication, each User 101 has a user password. In the illustrated embodiment the user password is a PIN 801. More generally the user password may comprise one or more words, or a string of numeric or alphanumeric characters.

The preferred operation of the System 10 is described in 5 Stages as follows:

Stage 1, Provider Registration 901, in which the Provider 102 registers with the Authentication System 201 as more fully described below;

Stage 2, Provider System Modification 902, in which the Provider 102 modifies their existing systems to incorporate such software, systems and processes as may be required to enable the Provider System 202 to utilize the Authentication System 201, as more fully described below;

Stage 3, Provider Application Registration 903 whereby the Provider 102 registers any of their Application(s) 601 as they may desire to use the Authentication System 201 to obtain User 101 authentication, as more fully described below;

Stage 4, the PAP Registration Process 904, whereby Users 101, in particular provider-specified users, are registered with the Authentication System 201 as illustrated in FIG. 2 to enable them to be authenticated; and Stage 5, the Authentication Process 905, whereby authentication is provided as illustrated in FIG. 3 and described more fully below.

In preferred embodiments, Stage 1 Provider Registration 901 involves the registration of the Provider 102 with the Authentication System 201. The preferred Authentication System 201 as shown in FIG. 1 consists of 3 basic structural components, firstly, the Authentication System Controller (Controller) 501 which controls, monitors, implements and co-ordinates, as required, all the processes performed by the Authentication System 201, including the storage and retrieval of data; secondly, the Authentication System Internet Channel Component (Internet Component) 502 which performs all tasks pertaining to communications to and from the Authentication System 201 over the internet and thirdly, the Authentication System PSTN Channel Component (Telephony Component) 503 which performs all tasks pertaining to communications to and from the Authentication System 201 over the PSTN, employing automated telephony systems. It is noted that while, in the illustrated embodiment, all three components are grouped together to provide the Authentication System 201, some or all of these components may themselves be remotely located and possibly obtained from third party services via the Internet 401.

The Provider System 202 may support one or more Applications 601 to be made accessible to Users 101 and/or Third Parties 103 by such means as the Provider 102 may determine, for example, via the Internet 401 or via a Provider User Interface (PUI) 302 provided to Users 101 for that purpose. The PUI 302 may be an application resident on a User 101 computing device, for example the User Phone Device 304 or other user computer, or may be accessed using a web browser (e.g., from the User Phone Device 304 or other user computer as is convenient). The Application 601 may alternatively be provided on other types of devices with computing capabilities, for example an electronic lock or a vehicle with controlled access. Most typically however, Applications 601 provide online services to Users 101 and/or Third Parties 103.

Provider Registration 901 in Stage 1 involves the establishment of a service relationship between the Provider 102 and the Authentication System 201. In alternative embodiments, provider registration may not be required, for example if the Authentication System 201 is deployed by the Provider 102 itself for its exclusive use.

In preferred embodiments, Users 101 have a User Email Account 602 (which may be provided by any Email Service 203 provider in any conventional manner) and a User Phone Device 304 to enable them to be authenticated by the Authentication System 201. In order to connect to the Telephone Network 402 the User Phone Device 304 has an active Phone Number 804, which is typically provided via a SIM card installed in the Device 304 but which may alternatively be a land line telephone number. There is no requirement that the User 101 has ownership of the User Device 304 or subscriber telephone account over which authentication occurs. For example, an employer may provide the User 101 with access to a cellular or landline phone that may be used by the User 101.

In the illustrated embodiment, the Authentication System 201 provides for a User 101 interface, shown as the System User Interface (SUI) 303, to enable a registered User 101 to access an account provided by the Authentication System 201 to the User 101 (hereinafter referred to as the User Account 805). The User Account 805 provides a means by which the User 101 can interact with the Authentication System 201, for example to provide the User 101 with access to records and logs of their Authentication System 201 usage, enable Users 101 to change their PIN 801, change System Safewords 802, Application Safewords 822 and/or such other capabilities as the Authentication System 201 may provide. Preferably any change of PIN 801 or Safewords by a User 101 requires Authentication System 201 verification by Authentication Call 911. An Authentication Call 911 is a call made by the Authentication System's 201 Telephony Component 503 as part of the authentication process of this invention as more fully described below. The User Account 805 includes or is associated with an electronic user record containing data pertaining to the respective User 101 that may be required during the authentication process.

Preferably the Authentication System 201 provides a user interface for use by the Provider 102, hereinafter referred to as the System Provider Interface (SPI) 301, that enables service enrolled Providers 102 to utilize and maintain a provider account provided by the Authentication System 201 (hereinafter referred to as the Provider Account 806), to enable the Provider 102 to access the capabilities of the Authentication System 201, call logs and the like as described herein and optionally, to select any such other third party security services or the like. For example, the Provider 102 may, from their Provider Account 806, mandate the use of cookies or security certificates or the like to restrict User 101 access to their Applications 601 to being made on certified devices or, using GPS technology or location tracking or the like, constrain the location from where the User 101 may either make Application 601 requests from or the location where they may use their Phone Device 304 to authenticate their identity.

Stage 2 Provider System Modification 902 involves the configuration (e.g. the integration of software and code provided by the Authentication Service 201) of the Provider's 102 existing computer systems as required by the Authentication System 201 to enable the Provider 102 to use the Authentication System 201. This typically involves making modifications to the Provider's 102 existing login processes, including modifications to application logins (shown as Application Login 604 in the example of FIG. 2), defining such system events—Authentication Triggers 920—as would necessitate authentication of a User 101 by the Authentication System 201, including, for example, a login request by a User 101 to an Application 601, the result of an interaction with a Third Party System 204, and any such other system modifications that may be required as would be apparent to those skilled in the art. Having identified what Provider System 201 events constitute Authentication Triggers 920, further processes need to be incorporated to the Providers System 201 to enable it to make authentication requests of the Authentication System 201. In particular, once an Authentication Trigger 920 has occurred, the Provider System 201 must compile the necessary data required by the Authentication System 201 to affect authentication, said data being Authentication Request Data 922. These modifications and other interactions with the Authentication System 201, are conveniently facilitated by an Application Programming Interface (API) 701 and/or the SPI 301, as applicable, provided and supported by the Authentication System 201 in any conventional manner. The precise nature of these modifications would be apparent to anyone familiar with the art, based on the processes involved in each Stage described herein.

Stage 3 Provider Application Registration 903 involves the registration by the Provider 102 of all Applications 601 with the Authentication System 201 that can are to use the Authentication System 201. As well as identifying the Applications 601 the Provider 102 can specify how many (i.e. one or more) different phone numbers of User Phone Devices 304 any one User 101 may be authenticated on, these being Designated Phones 306, typically allocated individual names for inclusion on the Application Login 604 interface where the Authentication System 201 is used to authenticate Users 101 prior to being granted access to an Application 601 and to provide redundancy and back-up authentication means. In this instance, the User 101 attempting a login can select which User Phone 304 they wish to be authenticated on. Where authentication arises for any other purpose, the Provider System 202 may request the Authentication Call 911 be made on such User 101 registered phones 304 as they may determine.

A User's registered Phone Device(s) 304 may be referred to as a Designated Phone(s). For example the Provider 102 may decide that the User 101 may use, for example, two Designated Phones to access an Application 601 and the two phones' designations may be, for example, "Cell" and "Desk", each with its own Phone Number 804. So when a User 101 attempts to log into the Application 601 via the Application Login 604, two User 101 selectable inputs may be presented labeled "Cell" or "Desk" indicating the phone device to be called on by the Authentication System 201. Any such designated phone device will have completed the User Registration Process 904 as described below. Accordingly, the Authentication System 201 can support the use by the User 101 of one or more User Phone Devices 304, each having one its own Phone Number 804, to effect User 101 authentication. Designated Phone 306 names may act as an aide memoir to Users 101 to identify which phone they wish to be called on when they wish to access an Application 601 as described in Stage 5 below; abstract or obscure Designated Phone 306 names may be applied to confuse any non-bone fide user.

An Application 601 may be identified to the Authentication System 201 in any convenient conventional manner including for example the identity of the Provider 102, the identity of the Application 601, a UID (Unique Identifier) for the application, the URL (Uniform Resource Locator) of the Application 601 and so on.

Stage 4 is the User Registration Process 904 a preferred embodiment of which is illustrated in FIG. 2 and comprises 7 Steps as follows:

Step 1: The Provider 102 requests User Registration 904 by the Authentication System 201. The Provider System 201 presents User Registration Data 915 to the Authentication System 201 over the internet via its Authentication Controller 701, said controller conveniently embodies all the software and processes required to facilitate communications between the Provider System 201 and the Authentication System 201 for the purpose of registering Users 101 and their authentication.

Step 2: On receipt of the said request and associated User Registration Data 915 by the Authentication System 201, the User 101 is sent an email to their Email Account 602 by the Authentication System 201;

Step 3a: The User 101 logs into their Email Account 602

Step 3b: The User 101 verifies their email address;

Step 3c: The User is provided with an (electronic User Enrolment Form 603;

Step 4: The User completes the User Enrolment Form 603, said user's enrolment data being provided to the Authentication System 201 via the Computer Network 401;

Step 5: The relevant Phone Number 804 of the relevant User Phone Device 304 detailed in the User Registration Data 915 is called by the Telephony Component 503 via the Telephone Network 402;

Step 6: The User 101 interacts with the Telephony Component 503 to complete registration over the Telephone Network 402;

Step 7: User Registration 904 is recorded by the Authentication System 201 as having been completed and this is reported back to the Providers System 202 via the Authentication Controller 701 via the Computer Network 401.

Each of the above seven steps of User Registration 904 are more fully explained below.

In Step 1 a Provider 102 requests the Authentication System 201 register Users 101 who are to be authenticated by the Authentication System 201. In the present example this is performed by the Providers System 202 via its Authentication Controller 701 across the Computer Network 401.

In order to affect User Registration 904 the Authentication System 201 requires data information from the Provider 102 about the User 101 being registered. This information is the User Registration Data 915 and typically includes the identity of the Application(s) 601 the User 101 has been granted access to by the Provider 102 and for which authentication is to be obtained, the Application(s) 601 having already been registered as previously described in Stage 3 as Provider Application Registration 903; the email address of the User's 101 Email Account 602 and the Phone Number 804 of User Phone Device 304 to be used to affect authentication. In this embodiment it is assumed that any User 101 being so registered has a pre-existing relationship with the Provider 102 such that the Email Address 602 and phone number of the User Phone Device 304 are known to the Provider 102.

Once the User Registration Data 915 is passed to the Authentication System 201, User Registration 904 Step 2 can proceed as follows.

Step 2 involves the email address of the User 101 being verified in a normal manner, typically by the Authentication System 201 sending an email to the User's Email Account 602 with a hyper-link provided in the body of the email which the User 101 clicks to provide email authentication in the standard manner.

Step 3a involves the User 101 logging onto their Email Account 602 hosted by the User Email Service 203 to access said email.

Step 3b requires the User 101 click the hyper-link in the body of the email to provide email authentication in the standard manner. Upon activation of the hyper-link the Authentication System 201 is notified that email verification has taken place.

Step 3c, the User 101 on clicking the hyper-link is taken to or presented with the User Enrolment Form 603 or may be presented with a separate hyper-link or URL they are required to visit. For example this may involve directing the User Phone Device 304, or other computing device being used by the User 101 during User Registration 904, to a web site by which the User Enrolment Form 603 is rendered to the User 101.

In Step 4 the User 101 completes the User Enrolment Form 603 to provide full and complete user enrolment data to the Authentication System 201. The preferred User Enrolment Form 603 may be in 3 Parts as follows.

In Part 1 of the User Enrolment Form 603 the User 101 may select from two options to confirm whether or not they have an existing User Account 805.

The contents of Part 2 of the User Enrolment Form 603 depends on the User's 101 response in Part 1. If the User 101 indicates in Part 1 of the Form 603 that they already have a User Account 805, they are requested to enter the User Name 803 they have previously created for that User Account 805. If the User 101 indicates in Part 1 that they are a new User 101, Part 2 of the From 603 requests that they create a User Name 803 for their User Account 805. The User Name 803 is the name used by the Authentication System 201 to uniquely identify the User 101. Users 101 enter their User Name 803 every time they attempt to log onto any Application 601 in respect of which they have completed User Registration 904. Each User Name 803 must be unique, i.e. not used by any other User 101 on the Authentication System 201, so said entry is confirmed by the Authentication System 201 to be unique and if it is not, the User 101 is requested to enter another User Name 803 until they create one that is unique. The User 101 is then requested to enter the Phone Number 804 of the User Phone Device 304 to be used for this User Registration 904. This phone number is checked by the Authentication System 201 to be the same Phone Number 804 contained in the User Registration Data 915 submitted by the Provider 102 in Step 1. Failure by the User 101 to input the correct phone number terminates the process.

Part 3 of the User Enrolment Form 603 may provide or request any other information that the Provider 102 or the Authentication System 201 may wish to communicate to or have provided by the User 101, for example including the name of the User 101 or Provider 102, the name of the Application 601 and, where applicable, the Designated Phone 306 name given by the Provider 102 to the Phone Number 804 of the User Phone Device 304 to which this registration relates, which will appear on the Application Login 604.

On completion of the User Enrolment Form 603, said form is submitted in full to the Authentication System 201 and may be checked for completeness and stored as required.

Step 5 provides that if the responses made on the User Enrolment Form 603 in Step 4 are confirmed to be valid and accurate, the Controller 501 causes the Telephony Component 503 to generate an automated User Registration Call 910 to the Phone Number 804.

In Step 6 the User 101 is called by the Telephony Component 503 of Authentication System 201, this being the User Registration Call 910. The form and content of this call depends on the data provided by the User 101 in the User Enrolment Form 603.

Where the User 101 indicated in the User Enrolment Form 603 that they did not have a User Account 805, this User Registration 904 is therefore the User's 101 first. In this case the User 101 is requested in the User Registration Call 910 to create a PIN 801, conveniently by keypad entry or other means provided by the User Device 304 and is additionally requested to record System Safewords 822, which may also be used as Application Safewords 802 (as described below) which the Telephony Component 503 records. Application Safewords 802 relate to a specific Application 601 so that whenever a User 101 is called by the Authentication System 201 as a result of an authentication request relating to that Application 601, the Application Safewords 802 are played to the User 101 to authenticate to the caller that the call is bone fide from the Authentication System 201. Obtaining Application Safewords 802 is an option the Application 601 Provider 102 may or may not exercise. However, the first time a User 101 completes the User Registration 904 process, regardless as to whether the Provider 102 that initiated said registration exercised said option or not, the User 101 is requested to record safewords. Said safewords in every such case will be stored in the Authentication System 201 by default as the User System Safewords 822 and if the option for Application Safewords 802 was exercised, said User 101 recorded safewords would be stored both as Application Safewords 802 and System Safewords 822. In the absence of such Application Safewords 802, the System Safewords 822 are played to the User 101 whenever the Authentication System 201 calls the User 101. Hereinafter, both Application and System Safewords are referred to as Safewords unless the particular instance has to be stated for clarity.

Where the User 101 indicated in the User Enrolment Form 603 that they have previously completed User Registration 904, the relevant Safewords are played to authenticate the Authentication System 201 to the User 101 and then the User 101 is requested, to enter their existing PIN 801 to authenticate them as the bone fide User 101 to the Authentication System. Optionally, the Provider 102 of the Application 601 to which this registration relates, may request the User 101 to enter Application Safewords 802. It can be seen that a User 101 may have recorded multiple Application Safewords 802, with each uniquely associated with a particular Application 601.

User 101 entry of both any entered PIN 801 and any recorded Safewords is confirmed by playback to the User 101 and once these are confirmed by the User 101 as being accepted by them, the PIN 801 is stored on the Authentication System 201 and associated with the Phone Number 804 of the User Phone Device 304 and the Safewords stored and associated with the User 101 and the Application 601 where applicable. Where this User Registration 904 is the first by a User 101 the Authentication System 201 creates a new User Account 805 for User Name 803.

Advantageously, the PIN 801 is not stored on the User Phone Device 304 but is stored with the Authentication System 201. The PIN 801 may be stored in an encrypted manner on the Authentication System 201 such that it cannot be decrypted except when the Authentication System 201 subsequently calls the User 101 on the said registered Phone Number 804. This association of the PIN 801 with the Phone Number 804 of the User Phone Device 304 forms a basis of providing strong authentication of the identity of the User 101 as provided by the Authentication Process 905 described in Stage 5 below.

Step 7 provides that confirmation that User Registration 904 has been completed is passed to the Provider System 202 and details of same stored on the Authentication System 201. In other embodiments the Provider 102 may confirm same to the User 101 by email, SMS or the like.

Stage 5 involves the Authentication Process 905, a preferred embodiment of which is illustrated in FIG. 3. It will be seen that authentication takes place over first and second communication channels, the first channel being established across the Computer Network 401 and the second channel being established across the Telephone Network 402.

Authentication arises as the result of an Authentication Trigger 920 (as previously determined in Stage 2) being detected by the Provider System 201. In the preferred embodiment of FIG. 3, the Authentication Process 905 is illustrated in 7 Steps, based on 3 typical instances of interactions with and events on a Provider System 201 that produce Authentication Triggers 920, whereby said triggers initiate this Authentication Process 905. Steps with the appendage letter "a" relate to a User 101 attempting to access Application 601 such that it generates an Authentication Trigger 920, Steps with the appendage letter "b" relate to a Third Party System 204 connected to or in communication with the Provider System 201 that generate an Authentication Trigger 920 and Steps with the appendage letter "c" relate to a Provider System 201 event that generates an Authentication Trigger 920.

Step 1a shows a User 101 seeking to access, via the Computer Network 401, an Application 601 for which the User 101 has completed User Registration 904, prompting said trigger.

Step 1b shows a Third Party System prompting said trigger.

Step 1c shows a Provider System 201 event prompting said trigger.

In every instance of an Authentication Trigger 920 being detected, authentication is determined by the Provider System 201 to be required from the User 101.

In Step 1a the User 101 via the Provider User Interface (PUI) 302 is presented with the Application Login 604 facility. In this example, to request access, the User 101 enters their unique User Name 803 in a dialogue box presented to them for this purpose at the Application Login 604. Where the User 101 can access said Application 601 from more than one User Phone Device 304, the User 101 is presented with, at the Application Login 604, a list of all available Designated Phones 306 that they can chose to be called on to effect authentication. Where the User 101 can only access said Application 601 from one User Phone Device 304, no such options are presented.

The User 101 may attempt to login to an Application 601 as shown in Step 1a, using the User Phone Device 304 in the event that it has computing capabilities that enable it to communicate with the Provider System 202 (e.g. in the case that the User Phone Device 304 is a Smartphone). Alternatively, the User 101 may perform Step 1 using any other computer, e.g. a laptop, PC or tablet (not shown).

Step 2a: Having entered their User Name 803 and, having selected the Designated Phone 306 they wish to be called on if that option exists, corresponding Authentication Request Data 922 may optionally be passed from the Application Login 604 to the Provider System 202 and onto the Authentication Controller 701. Optionally, a randomly generated alphanumeric, known as the Application Login Security (ALS) Code 921, passed back from the Provider System 202 to the Application Login 604 and displayed on screen or presented to the User 101 in such manner as may be appropriate to the nature of the interaction: for example where a screen is not employed, where the User 101 may be attempting to gain access to a physical location, the ALS Code 921 may be delivered by automated spoken means to the User 101. This ALS Code 921 option, if exercised, is included in the corresponding Authentication Request Data 922. This option may be invoked where the Provider 102 wishes to authenticate the identity of the specific Application 601 to the User 101 prior to the User 101 proceeding.

Step 2b provides that a predefined Authentication Trigger 920 having been detected as a result of an interaction between a Third Party System 204 and an Application 601 on the Provider System 202 as provided for in Step 1b, corresponding Authentication Request Data 922 is passed from the Application 601 to the Provider System 202 and onto the Authentication Controller 701.

Step 2c provides that an Authentication Trigger 920 may be generated as a result of any event on the Provider System 202 such that it would be desirable for the Provider 102 to obtain authentication from the User 101. For example, the Provider System 202 may detect that a User 101 service agreement with the Provider 102 may shortly expire, so it would be desirable to obtain from the User 101 personally, permission to mandate the Users 101 service renewal. In preferred embodiments the User 101 will have given permission for the Provider System 202 to make any such authentication request. Corresponding authentication request data is passed from the Provider System 202 onto the Authentication Controller 701.

In preferred embodiments authentication requests by the Provider System 201 can relate to a multiplicity of circumstances wherein it would be desirable for the Provider 102 to obtain authentication from the User 101. It would be desirable to convey to the User 101 at the start of the Authentication Call 911 what the precise purpose of the authentication request is, prior to the User 101 entering their PIN 801. The statement that qualifies to the User 101 the purpose of the call and what PIN entry by them would authenticate is a Qualifying Statement 925. In preferred embodiments, such Qualifying Statements 925 are either entirely or partially pre-determined or generated ad hoc, depending on the nature of the Authentication Trigger 920. For example, if the authentication request relates to payment of an outstanding amount by the User 101, that amount may be included in the Qualifying Statement 925, in which case that component of said statement can only be determined when the amount concerned is known, whereas much of the body of the statement may remain fixed, with only the amount being a variable. Conveniently, anyone skilled in the art can compile such a statement either as a contiguous text file or as an audio file created from said contiguous text or the like. This Qualifying Statement 925 can therefore be compiled in whole or in part by the Provider System 201 when the Authentication Trigger 920 occurs and be included in the Authentication Request Data 922. If the Qualifying Statement 925 has no variable elements, it may be stored in its entirety as a text or audio file on the Authentication System 201 and identified in the Authentication Request Data 922. Alternatively, the fixed components only of the statement may be stored in the Authentication System 201 so only the variable components of the statement need be included in the Authentication Request Data 922 along with an identifier for the Qualifying Statement 925 stored on the Authentication System 201 to which said data relates and the complete Qualifying Statement 925 is compiled from said received variable elements and the fixed elements stored at the Authentication System 201.

Step 3 provides that all Authentication Request Data 922 generated as a result of the Authentication Trigger 920 now held on the Authentication Controller 701, are checked for completeness and then delivered to the Authentication Service 201 over the Computer Network 401 in such manner and format as the Authentication Service 201 may require. Said Authentication Request Data 922 may include the identity of the Application 601, the identity of the Provider 102 of said application, the User 101 Authentication System User Name 803, the identity of the Designated Phone 306 (where applicable), a Qualifying Call Script 930 (where applicable) or a Qualifying Call Script 930 identifier or variable elements (where applicable, where the qualifying call script is stored in whole or in part at the Authentication System 201) and the ALS Code 921 (where applicable).

The Authentication System 201 checks that the Application 601 identified by the Authentication Request Data 922 is associated with a Provider 102 and User 101 and that both have been validly registered with the Authentication System 201. Where necessary, any Qualifying Statement 925 is compiled in its entirety. These and any other data items as the Authentication System 201 may require having been confirmed and validated, the Controller 501 causes the Telephony Component 503 to call the phone number of the User Phone Device 304 for the Designated Phone 306, which call may be referred to as the Authentication Call 911.

Step 4 provides that the Telephony Component 503 generates and establishes the Authentication Call 911 to the User Phone Device 304 as identified in the received Authentication Request Data 922 over the Telephone Network, the form and content of said call are described in Step 5.

Step 5 involves an automated interaction between the Telephony Component 503 of the Authentication System 201 and the User 101 via the User's Phone Device 304 across the Telephone Network 402. In preferred embodiments, the call is in 2 parts. The first part of the call consists of the delivery to the User 101 by the Telephony Component 503 in spoken form, any or all of the following: a greeting, the name of the Provider 102 and/or the Application 601 to which the call relates, the appropriate Safewords, where the ALS Code 921 option is employed, the alphanumeric ALS Code 921 that was displayed on the Application Login 604 or otherwise conveyed to the User 101, any Qualifying Statement 930, a request to the User 101 to enter their PIN 801 and any other statements or the like the Provider may wish to deliver either as a standard part of the Authentication Call 911, on a selective or ad hoc basis, the inclusion of such statements being made as part of the Authentication Request Data 922 or created by the Provider 102 via the System Provider Interface 301 that may enable the provider 102 to customize this part of the call to meet their specific requirements. All of these possible components are either in the form of audio files or text files rendered by Text to Speech Technology by the Telephony Component 502, said files either predetermined or generated on an ad hoc basis by the Provider System 201, and may be stored with the Authentication System 201 to be invoked as part of the Authentication Call 910 as and when the Provider 102 may determine either by default or as indicated in the Authentication Request Data 922.

The second part of the call consists of entry by the User 101 of their PIN 801 by entry on their phone keypad or other suitable input means to authenticate their identity and/or to acknowledge the accuracy of, provide consent to or otherwise confirm their acceptance of any request that was made in part one of the call, in particular as given in any Qualifying Statement 925. In preferred embodiments the User 101 will only enter their PIN 801 where, if included in said call, the Safewords played to the User 101 are recognized by them as their current System Safewords 822 relating to the Authentication System 201 or (where applicable) the Application Safewords 802, and (where applicable) the ALS Code 921 spoken to them matches that displayed on screen at the Application Login 604 or otherwise conveyed to them previously and/or where doing so is congruent with the Users 101 wish to confirm, validate, acknowledge, accept or otherwise mandate any request made in any Qualifying Call Script 930 delivered to them as part of said call.

The PIN 801 entered by the User 101 is communicated to the Authentication System 201 and is checked by the Authentication System 201 to be correctly associated with the User 101 with the Phone Number 804 of the User Phone Device 304 being called. In preferred embodiments where a PIN entry is made, the correctness or otherwise of said PIN entry by the User 101 may reported to back the User 101 during the call. If the report given to the User 101 is that the PIN entry was incorrect or otherwise detected to be in error, the User 101 may be given the option to re-enter their PIN 801. This re-entry option as the result of an incorrect entry can be presented to the User 101 as many times as the Authentication System 201 may support. Non-entry of the requested PIN or the failure by the person called to enter the correct PIN 801 is regarded as non-authentication of the User 101 or as a negative response by the User 101 to any request for validation, acknowledgement, agreement or the like, made in said call.

In Step 6 the response of the User 101 as a result of the Authentication Call 911 is reported by the Authentication System 201 back to the Authentication Controller 701 of the Provider System 202. Said response is processed and formatted by the Authentication Controller 701 in such a manner as previously determined to enable said response to be passed back to the appropriate source of the authentication trigger and authentication request within the Provider System 202.

Step 7a illustrates the response path where the authentication request was made in as a result of an attempt by the User 101 to access the Application 601. In preferred embodiments correct PIN 801 entry reported to the Provider System 202 provides that the User 101 may be granted access to the Application 601 via the Application Login 604 at the determination of the Provider System 202.

Step 7b provides that where the authentication request was made as the result of a Third Party System 204 interaction with an Application 601 on the Provider System 202, the response of the User 101 is passed by the Authentication Controller 701 to such part of the Provider System 202 that made the authentication request for further interpretation and processing and the appropriate response, if any, passed to the Application 601 and where appropriate, reported back to the Third Party System 204 and any other Provider System 202 processes invoked as required.

Step 7c provides that where the authentication trigger or request was made as the result of a System Trigger 1c, the response of the User 101 is passed back to the Provider System 202 to be processed as previously determined and any other Provider System 202 processes invoked as required.

The Authentication System 201 advantageously logs all User Registration Calls 910, Authentication Calls 911 any other calls said system makes, all material interactions between the Authentication System 201 with Users 101 and Providers 102 remotely, typically via their User Account 805 and Provider Account 806, together with any related data, and makes a corresponding record of such available to Users 101 and Providers 102 via their respective interfaces 303 and 301.

It is noted that while typical embodiments preferably support the use of PINs as a user password, any form of password may be used for user verification. Typically the User 101 password is an alphanumeric password (an example of which is a numeric PIN) but it may comprise any other character string. In preferred embodiments the User password, e.g. PIN 801 is entered by the User 101 using the keypad or other manual input means on the User Phone Device 304. However, some embodiments may support a spoken User 101 password, e.g. comprising one or more words, which may be provided to the Authentication System 201 in the same way that the Safewords are obtained as described above, or in any other convenient conventional manner. In such cases, the Telephony Component 503 of the Authentication System 201 is provided with voice recognition software in order to recognize a spoken password during Step 5 of the Authentication Process 905 as described in Stage 5 (i.e. the Authentication Call 911 process) above. It will be understood that the word password as used herein is not to be construed as limited to comprising a single word.

In alternative embodiments, the spoken Safewords described above may be replaced by any other convenient system password that is capable of being rendered to the User 101 via the User Phone Device 304. For example, the User 101 may have, during User Registration 904, entered an alphanumeric password, or string of characters (by any supported input means, e.g. keypad, touchscreen or by speaking into a microphone), which the Authentication System 201 may subsequently cause to be rendered to the User 101 during the Authentication Call 911, by any supported output means, e.g. a screen or audio playback. Even if the User did not provide the system password in audio form, the Authentication System 201 may be configured to render it to the User in audio form. It will be understood that the word password as used herein is not to be construed as limited to comprising a single word.

It will be seen from the foregoing that preferred embodiments of the invention provide strong (i.e. multi-factor) authentication as to the identity of a user (the Authenticatee) of a remote system or service to the provider (Authenticator) of same and for the identity of said remote system or service to be authenticated to the user of same, simultaneously utilizing the internet as one channel and utilizing any phone connected to the telephone network as another channel, with both channels enmeshed as described above. In alternative embodiments, the system may provide authentication as to the identity of a user (the authenticatee) as described above but not authentication as to the identity of the provider (the authenticator), or vice versa.

It is further to be seen from the foregoing that preferred embodiments provide such system or service providers with considerable flexibility regarding when they may request authentication and regarding what matters they may deem it either desirable or necessary to obtain authentication about from users, which includes not only interactions with users, but where interaction with third parties make it desirable to obtain authentication from a user.

Preferred embodiments replace the multiplicity of passwords and tokens currently required by a user as authentication means to the many online services and systems the user may wish to access and use with a single authentication means that operates in an identical fashion with all said systems and services and as a means of providing the user with authentication as to the identity of the systems or services the user is about to access or use or when said systems or services contact the user. Preferred embodiments are beneficial to users in terms of convenience, simplicity and speed of use and advantageous to service providers by its universal availability, its provision of a highly secure strong authentication means at minimal implementation and support costs, its speed and the flexibility as to which matters they can authenticate directly from users.

The described method of linking the telephone network to the internet as separate but enmeshed channels over which authentication is both obtained and provided, renders the system highly resistant to fraud and in particular, man in the middle attacks.

Given the ubiquitous nature of telephone ownership and the global deployment of the PSTN and the Internet, and given that these components, as innovatively utilized by this invention, form the basis of the system and methods herein described, are already in place, deployment of this invention can be readily achieved anywhere the PSTN and Internet are deployed, with the only requirement for said user authentication to be achieved by this invention—aside from the deployment of the a system of this invention capable of facilitating the method of it—being that the user be in possession of or have access to any telephone that can connect to the PSTN, with no necessity for the user to be in possession of a computing device or for said device to be connected to the internet for authentication to be obtained from them. The further utility of this invention is that it enables the identity of the system or service said user is attempting to access or which is in communication with the user, to be authenticated to the user by the same system and method as herein described.

This invention can also be beneficially combined with existing security systems as provided for by the known art, including inter alia, technologies that can authenticate the identity of the device being used to request access to an application, the location of that device, the location of any mobile phone used to authenticate the user by this invention or biometric systems resident on that device (e.g. fingerprint or facial recognition software) or operating remotely (e.g. voice recognition systems). Anyone skilled in the known art can facilitate the addition of these security systems to this invention or the affect the addition of this invention to security systems available under the known art.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. An authentication method for a telecommunications system comprising a computer network and a telephone network, the method comprising:
   in a user registration process for a user:
      establishing by said telephone network a registration telephone call from an Authentication System to a telephone device using a telephone number associated with the user;
      creating, during said registration telephone call a user password using a keypad of said telephone device;
      sending, during said registration telephone call, the user password created using said keypad from said telephone device to said Authentication System;
      receiving, at said Authentication System during said registration telephone call, said user password from said telephone device;
      storing said user password created using said keypad and received from the telephone device during the registration telephone call in association with said telephone number; and
   in a user authentication process that is separate from said user registration process:
      receiving, at said Authentication System across said computer network, data indicative of an authentication request associated with said user;
      in response to receiving said data indicative of said authentication request, establishing by said telephone network an authentication telephone call from said Authentication System to said telephone device, or to another telephone device, using said telephone number associated with said user or another telephone number associated with said user;
      entering, during said authentication telephone call using the keypad of the telephone device with which the authentication telephone call is established, a password for authentication;
      receiving, at said Authentication System during said authentication telephone call, the entered password for authentication;
      determining at said Authentication System if the entered password for authentication received during said authentication telephone call matches the user password received during said registration call and stored by said user registration process for said user; and
      authenticating said authentication request if said password for authentication received during said authentication telephone call is determined to match the user password stored by said user registration process for said user.

2. The method of claim 1, including delivery by said Authentication System to said authentication telephone device during said telephone call identification data, typically identification data relating to said authentication request, said identification data for example comprising any one or more of a provider name, provider password, system password, application password, a login security code or a qualifying statement.

3. The method of claim 1, wherein determining if said user password is valid involves determining if said user password received during said authentication telephone call is linked to said telephone number used to establish said authentication telephone call.

4. The method of claim 1, including creating said authentication request by a provider computer system in response to an authentication trigger, and wherein, preferably, said authentication trigger comprises a system event caused or otherwise associated with said user, optionally a system event on a provider's computer system, and wherein, optionally, said authentication trigger comprises any one of: an input to, an interaction with or an activity on a provider's computer system, made for example by any one or more of a user, or a provider employee or third party.

5. The method of claim 1, including creating said authentication request by a user access request involving establishing, at a user computing device, a connection across said computer network with a provider computer system or other computing device, and preferably also creating said access request by establishing, at a user computing device, a connection with a provider computer system to access at least one software application supported by said provider computer system.

6. The method of claim 5, including compiling, in response to said authentication trigger, typically at said provider computer system, authentication request data, said data comprising data indicative of any one or more of: the identity of said user, the provider's identity, a provider system identity, a computing device identity, at least one software application identity, the contents of or identity of a qualifying statement, the location of said user telephone device or an identity of said user telephone device, and wherein, preferably, said authentication request data comprises data indicative of the identity of said user and/or at least one telephone number associated with said user.

7. The method of claim 1, including providing a qualifying statement in the registration telephone call, said qualifying statement comprising a spoken message, and wherein said qualifying statement optionally comprises a text string to be converted into speech, or an audio file, or other data capable of being audio-rendered.

8. The method of claim 4, including compiling, in response to said authentication trigger, typically at said provider computer system, authentication request data, said data comprising data indicative of any one or more of: the identity of said user, the provider's identity, a provider system identity, a computing device identity, at least one software application identity, the contents of or identity of a qualifying statement, the location of said user telephone device or an identity of said user telephone device, and including generating said all or part of qualifying statement, preferably by the provider computer system, in response to the authentication triggering event, and delivering said qualifying statement to the authentication system as part of the authentication request data.

9. The method of claim 4, including compiling, in response to said authentication trigger, typically at said provider computer system, authentication request data, said data comprising data indicative of any one or more of: the identity of said user, the provider's identity, a provider system identity, a computing device identity, at least one software application identity, the contents of or identity of a qualifying statement, the location of said user telephone device or an identity of said user telephone device, and wherein all or part of said qualifying statement is pre-determined and stored at the Authentication System and identified for use by the authentication request data.

10. The method of claim 1, including maintaining at said Authentication System, an electronic user record for each user of the system, the user record containing data indicative of at least one user password, and wherein, optionally, said user record contains data linking the, or each, user password to a respective telephone number, and optionally to any one or more of at least one software application, a provider identity, a provider system identity, at least one user telephone device, or a computing device identity.

11. The method of claim 1, including maintaining at said Authentication System an electronic provider record for each system provider, the provider record comprising data indicative of any one or more of the provider name or other identifier, and optionally qualifying statement data, for example comprising text or audio files.

12. The method as claimed in claim 10, wherein said determining if the password received during said authentication telephone call matches the user password received during said registration call and stored by said user registration process involves matching the password received during said authentication telephone call to at least some of the data in the user record for the respective user.

13. The method of claim 10, wherein said determining if the password received during said authentication telephone call matches the user password received during said registration call and stored by said user registration process involves matching the password received during said authentication telephone call to the user password contained in the respective user record for the respective telephone number.

14. The method of claim 10, further including matching, at said Authentication System, the received authentication request data to at least some of the data in the respective user record for the user, and establishing said authentication telephone call upon determining that there is at least one match between the respective data, and wherein, preferably, matching the received authentication request data to at least some of the data in the respective user record for the user involves matching the authentication request data with any one or more of a provider identity, provider system identity, computing device identity, qualifying statement script, at least one software application identity or identity of said user telephone device with the corresponding data of the respective user record.

15. The method of claim 10, wherein establishing said authentication telephone call or said registration telephone call involves obtaining said telephone number from a respective user record, and wherein, preferably, said user record contains more than one telephone number and establishing said authentication telephone call or said registration telephone call involves selecting one of said telephone numbers, optionally as identified in authentication request data.

16. The method of claim 1 including, in response to receiving authentication request data, the method includes transmitting to said telephone device from said Authentication System during said authentication telephone call, at least one password, for example a system password(s) and/or application password(s), associated with said telephone number and rendering said password(s) to said user by said telephone device, wherein, optionally, the password(s) rendered are indicated by the received authentication request data or a qualifying statement.

17. The method of claim 1, including determining at said Authentication System a location of said user; and authenticating said authentication request if said location is determined to be valid.

18. The method of claim 1, including maintaining at said Authentication System, an electronic user record for each user of the system, the user record containing data indicative of one or more valid location, said location data optionally being linked to any one or more of the user, at least one telephone number associated with the user, a provider identity, a provider system identity, a computing device identity, at least one software application identity and/or an identity of said user telephone device.

19. The method of claim 10, wherein said electronic user record includes data linking said at least one user password to a respective telephone number, and wherein said determining if the password received during said user authentication process authentication telephone call matches the user password received during said registration telephone call and stored by said user registration process involves using said user record to determine if said user password received during said authentication telephone call is linked to the telephone number used to establish said authentication telephone call.

20. The method of claim 1, wherein said user password comprises a personal identification number (PIN) or a string of alphanumeric characters.

21. An authentication method for a telecommunications system comprising a computer network and a telephone network, the method comprising:
  in a user registration process for a user:
    establishing by said telephone network a registration telephone call from an Authentication System to a telephone device using a telephone number associated with the user;
    creating, during said registration telephone call, a user password using said telephone device;
    sending, during said registration telephone call, said user password created using said telephone device from said telephone device to said Authentication System;

receiving, at said Authentication System during said registration telephone call, said user password from the telephone device;

storing said user password created using said telephone device and received during the registration telephone call in association with said telephone number; and in a user authentication process:

receiving, at said Authentication System across said computer network, data indicative of an authentication request associated with said user, in response to receiving said data indicative of said authentication request, establishing by said telephone network an authentication telephone call from said Authentication System to said telephone device, or to another telephone device, using said telephone number associated with said user or another telephone number associated with said user;

entering, during said authentication telephone call, a password for authentication using the telephone device with which the authentication call is established;

receiving, at said Authentication System during said authentication telephone call the entered password for authentication;

determining at said Authentication System if the entered password for authentication received during said authentication telephone call matches the user password received during said registration call and stored by said user registration process for said user; and authenticating said authentication request if said password for authentication received during said authentication call is determined to match the user password stored by said user registration process for said user.

22. An Authentication System for a telecommunications system comprising a computer network and a telephone network, the Authentication System being configured to support a user registration process and a user authentication process, wherein in said user registration process said authentication system is configured to:

establish by said telephone network a registration telephone call to a telephone device using a telephone number associated with a user;

receive, from said telephone device during said registration telephone call of said user registration process, a user password created using said telephone device;

store said user password created using said telephone device during said registration call and received from said telephone device during said registration call in association with said telephone number, and wherein in said user authentication process said authentication system is configured to:

receive, across said computer network, data indicative of an authentication request associated with said user, establish, in response to receiving said data indicative of said authentication request, by said telephone network an authentication telephone call to said telephone device, or to another telephone device, using said telephone number associated with said user or another telephone number associated with said user;

receive during said authentication telephone call of said user authentication process, a password for authentication entered using the telephone device with which the authentication call is established;

determine if the password for authentication received during the authentication call of said user authentication process matches said user password received during said registration call and stored by said user registration process for said user; and authenticate said authentication request if said password for authentication received during the authentication call of said user authentication process is determined to match the user password stored by said user registration process for said user.

\* \* \* \* \*

UNITED STATES PATENT AND TRADEMARK OFFICE
CERTIFICATE OF CORRECTION

| | |
|---|---|
| PATENT NO. | : 11,599,607 B2 |
| APPLICATION NO. | : 16/338621 |
| DATED | : March 7, 2023 |
| INVENTOR(S) | : Arnold Albert Wilson |

It is certified that error appears in the above-identified patent and that said Letters Patent is hereby corrected as shown below:

In the Claims

Column 26
Claim 3, Line 28, delete "user" before "password"

Column 28
Claim 19, Line 41-42, delete "user authentication process" before "authentication telephone call"

Column 28
Claim 19, Line 45, delete "user" before "password"

Signed and Sealed this
Thirtieth Day of April, 2024

Katherine Kelly Vidal
*Director of the United States Patent and Trademark Office*